United States Patent
Haggans et al.

(10) Patent No.: US 7,415,208 B1
(45) Date of Patent: Aug. 19, 2008

(54) METHOD AND SYSTEM FOR ALLOCATING BANDWIDTH IN AN OPTICAL COMMUNICATION NETWORK

(75) Inventors: Charles Haggans, Clarksville, MD (US); Michael Frankel, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 970 days.

(21) Appl. No.: 10/392,625

(22) Filed: Mar. 20, 2003

(51) Int. Cl.
*H04B 10/20* (2006.01)
*H04J 14/00* (2006.01)

(52) U.S. Cl. .......................... 398/57; 398/49
(58) Field of Classification Search .................. 398/49, 398/57
See application file for complete search history.

(56) References Cited

U.S. PATENT DOCUMENTS

| | | |
|---|---|---|
| 6,351,322 B1 | 2/2002 | Ransford et al. |
| 7,171,124 B2 * | 1/2007 | Smith et al. ................ 398/97 |
| 2003/0016414 A1 * | 1/2003 | Solheim et al. ............ 359/127 |
| 2003/0099014 A1 * | 5/2003 | Egner et al. ............... 359/124 |
| 2003/0219198 A1 * | 11/2003 | Zhou ............................ 385/24 |

OTHER PUBLICATIONS

"Optimization Theory with Application" by D. Pierre, 1986, Dover, pp. 5-22.*

* cited by examiner

*Primary Examiner*—Shi K Li
(74) *Attorney, Agent, or Firm*—Clements Bernard Miller; Christopher L. Bernard; Tyler S. Brown (57) ABSTRACT

A method and system for allocating bandwidth in a communication network is disclosed. Processing a request for bandwidth includes evaluating potential paths. Configuration rules and propagation rules may be applied to eliminate non-viable paths. A path quality indicator for remaining paths is derived based on calculations and signal characteristic measurements. A path having a suitable path quality indicator is selected and may be validated using existing representative or new signals.

17 Claims, 8 Drawing Sheets

METHOD AND SYSTEM FOR ALLOCATING BANDWIDTH IN AN OPTICAL COMMUNICATION NETWORK

BACKGROUND OF THE INVENTION

1. Field of Invention

The invention relates generally to optical communication networks and in particular to methods and systems for allocating bandwidth in an optical communication network.

2. Description of Related Art

Optical communication networks use optical to electrical to optical (OEO) conversion to regenerate signals on the network. Although such OEO regeneration maintains signal quality, there are significant costs associated with the process. These costs appear as equipment expense, increased power consumption, and increased space requirements.

In order to avoid unnecessary OEO regeneration points in Wavelength Division Multiplexed (WDM) networks, it is desirable to route wavelengths such that the number of OEO sites is substantially reduced. Regeneration of an individual wavelength is not required if the optical signal maintains sufficient quality to insure an error rate at the receiver below a specified threshold. Further, changing network traffic demands will require establishing new optical paths for wavelength signals. However, the anticipated signal quality at the ultimate receive node for the new path is not known in advance due to the analog nature of optical signal propagation. Thus, it is difficult to determine if such a desired path would be viable.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of embodiments of the invention refers to the accompanying drawings. The same reference numbers in different drawings identify the same or similar elements. Further, the following detailed description does not limit the invention. Instead, the scope of the invention is defined by the appended claims and equivalents thereof.

The invention may be used in a variety of communications networks, including electrical and optical networks, and combination electrical/optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connected" and "coupled" as used herein are relative terms and do not require a direct physical connection.

Figure 1:
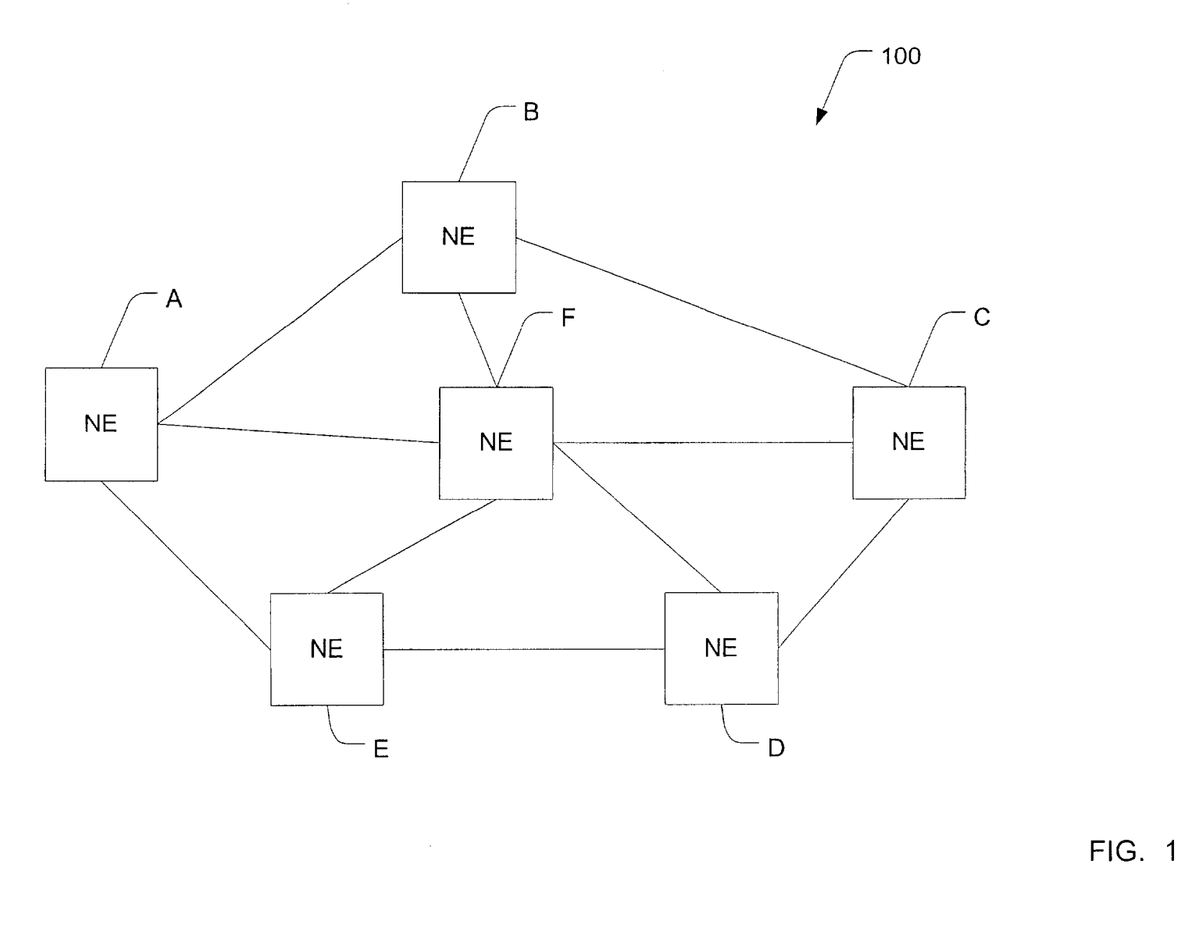
FIG. 1 is a block diagram of a communication system in an embodiment of the invention.

FIG. 1 is block diagram of a communication network 100 in an embodiment of the invention. The communication network 100 includes a number of network elements (NE) referenced as A through F. The network elements may be any known type of network elements such as terminals, switches, routers, etc. The network elements in FIG. 1 are arranged in a mesh configuration, but the invention is applicable to a variety of network configurations. In one embodiment of the invention, the communication network 100 employs optical wavelength division multiplexing (WDM) to carry traffic on the fiber network.

Figure 2:
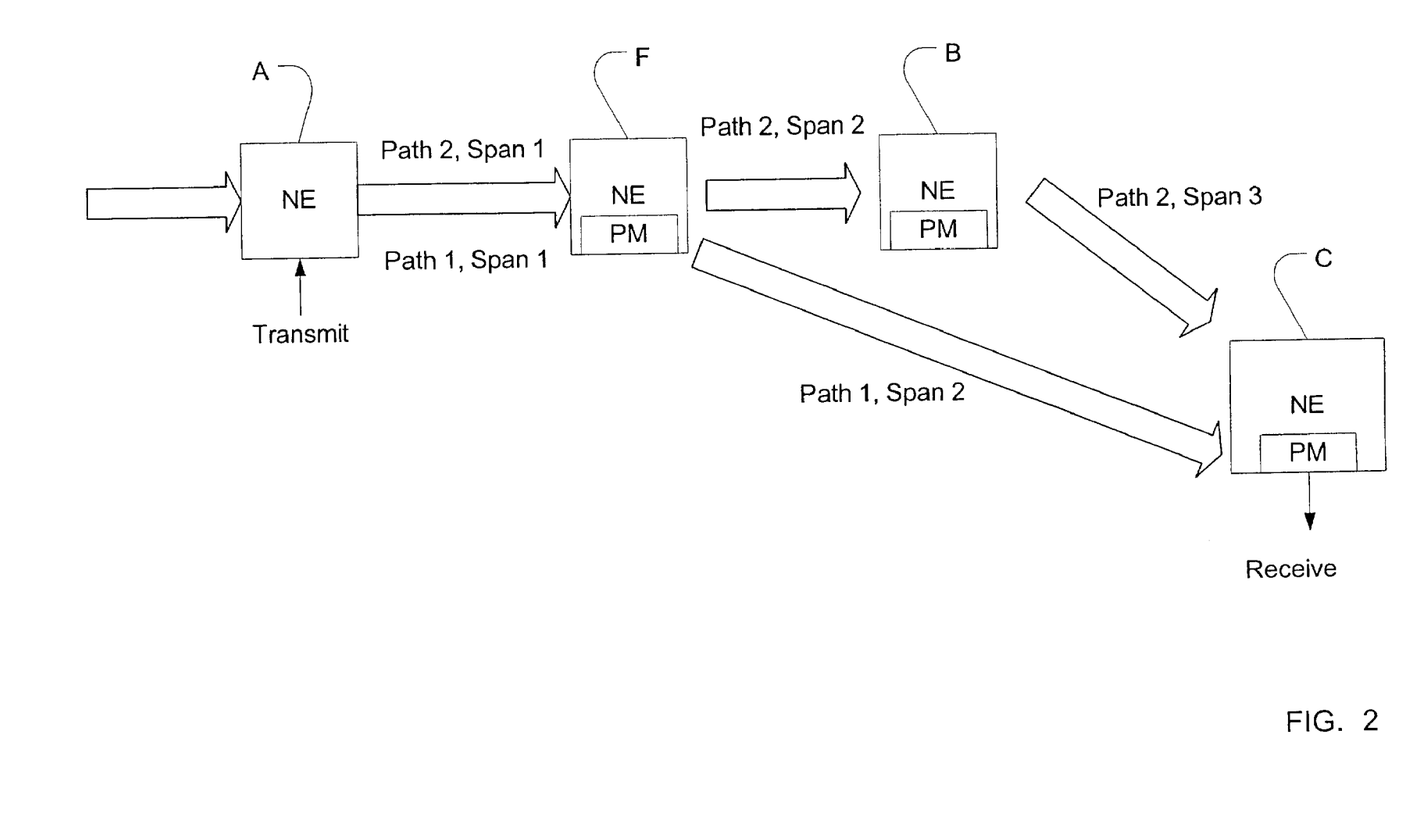
FIG. 2 is a block diagram illustrating a portion of the paths in the communication system of FIG. 1.

The connection between two network elements is referred to as a span. The span may include other components such as add-drop multiplexers, amplifiers, etc. Embodiments of the invention manage the assignment of bandwidth through the communication network 100 by evaluating paths between network elements. FIG. 2, for example, shows exemplary connections between network element A and network element C.

Figure 3:
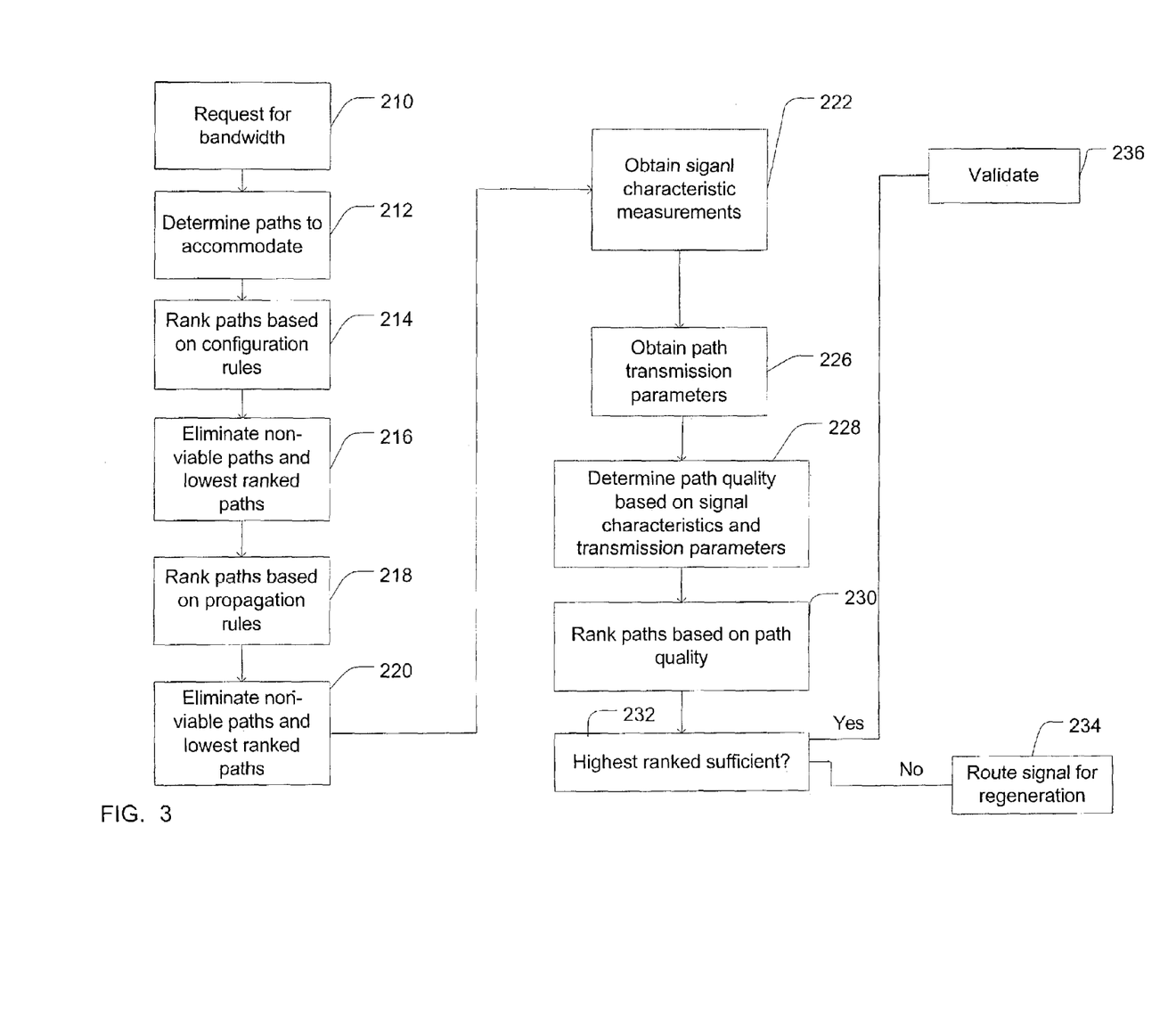
FIG. 3 is a flowchart of a process for allocating bandwidth.

An exemplary embodiment of a process of managing bandwidth is shown in FIG. 3. The process begins at step 210 with a request for additional bandwidth. This request may arise at various times. During design of the communication network, bandwidth is requested to accommodate users' needs. Once the network is deployed, requests for bandwidth may arise from existing or new customers. Alternatively, the bandwidth request may be initiated during network operation to request a redistribution of bandwidth along the network. For example, if a connection between network elements ABC is experiencing a disruption, a request for bandwidth may be initiated to redistribute bandwidth on the communication network. For purposes of illustration, assume that the request requires additional bandwidth between network elements A and C.

The process flows to step 212 where the potential paths between network element A and network element C are defined. At this stage, all paths may be considered as viable. At step 214, the paths are ranked based on one or more configuration rules. The configuration rules relate to the physical connections and capacities along the path. The configuration rules may be specified so as to minimize network cost and to achieve load balancing across paths.

The configuration rules consider configuration factors such as excess path capacity (e.g., can the path support the requested bandwidth), path length, number of regeneration points in the path, number of bypassed nodes in the path, etc. Additionally, if there are configuration constraints based on not sharing bandwidth with other paths (e.g., in the case of diverse routing for protection), those paths are eliminated. Another configuration factor may be the number of OEO regenerations to be allowed per signal. Regeneration may be used due to wavelength blocking or to excessive propagation distance for a path. The number of regeneration points in the path is determined. Paths having a number of regeneration points exceeding a regeneration limit may be eliminated from further consideration.

The various configuration factors may be weighted and combined to determine a configuration rank for each path. Preferably, the shortest optical paths with high excess capacity and fewest number of bypassed nodes or optical regenerations result in highest weighted rankings.

At step 216, any paths not meeting configuration constraints and, optionally, a number of lowest ranked paths are eliminated from consideration for supporting the bandwidth request.

Remaining paths are then evaluated and ranked based on propagation rules at step 218. The propagation rules are based on propagation factors such as propagation penalty and dispersion. The propagation rules are applied to identify paths that significantly exceed the propagation limits of the network. One exemplary propagation factor is an effective propagation penalty a signal (e.g., a wavelength in a WDM system) can experience without regeneration. A propagation penalty may use analytic or empirically based calculations to quickly and efficiently estimate path viability based on the number and type of components (e.g., amplifiers, add-drop multiplexers, bypass switches) in the path, as well as the capacity load of the path.

For example, amplified spontaneous emission noise can be estimated based on wavelength signal power, optical amplifier noise figure and inter-amplifier losses. Paths having a propagation penalty exceeding a propagation penalty limit may be eliminated from further consideration. It is important to note that path viability should be considered not only for the new signals, but also for existing WDM signals to ensure that they are not degraded below a specified limit when new ones are added.

Another propagation factor may be dispersion based on the dispersion map. Without detailed calculation, a determination as to whether a channel could be terminated at a particular node could be made, for example, based on residual chromatic dispersion at that node.

For each path, the propagation factors (e.g., propagation penalty and dispersion) are combined to define a propagation rank. The propagation factors may be weighted to increase the importance of one factor relative to the other. The paths are ordered based on the combined propagation rank and a number of lowest ranked paths may be eliminated from further consideration at step 220. In addition, paths not meeting one or more propagation constraints may be eliminated.

At step 222, one or more signals are transmitted along one or more highest ranked paths in accordance with the bandwidth request. This may be an existing representative signal, or a newly added signal. In the present example, signals are transmitted from network element A to network element C along paths that satisfy both the configuration rules and the propagation rules, and that have not been eliminated from consideration.

Signal characteristic measurements are made along each path under consideration. In the example shown in FIG. 2, network elements F, B and C include a performance monitor (PM) that obtains one or more signal characteristic measurements. The signal characteristic measurements may include features such as signal-to-noise ratio (SNR), self phase modulation (SPM), cross phase modulation (XPM), four wave mixing (FWM), back-to-back quality (e.g., signal quality of network element feeding output to its input), bit error rate, phase shift, amplified spontaneous emission (ASE) noise, eye opening, estimated quality factor, dispersion, eye closure, etc. Other known signal characteristic measurements may be used such as those described in U.S. Pat. No. 6,351,322. The outcome of these signal characteristic measurements may be descriptive information relating to the physical path, such as accumulated dispersion, or they may be signal quality measurements such as OSNR or Q.

Figure 4:
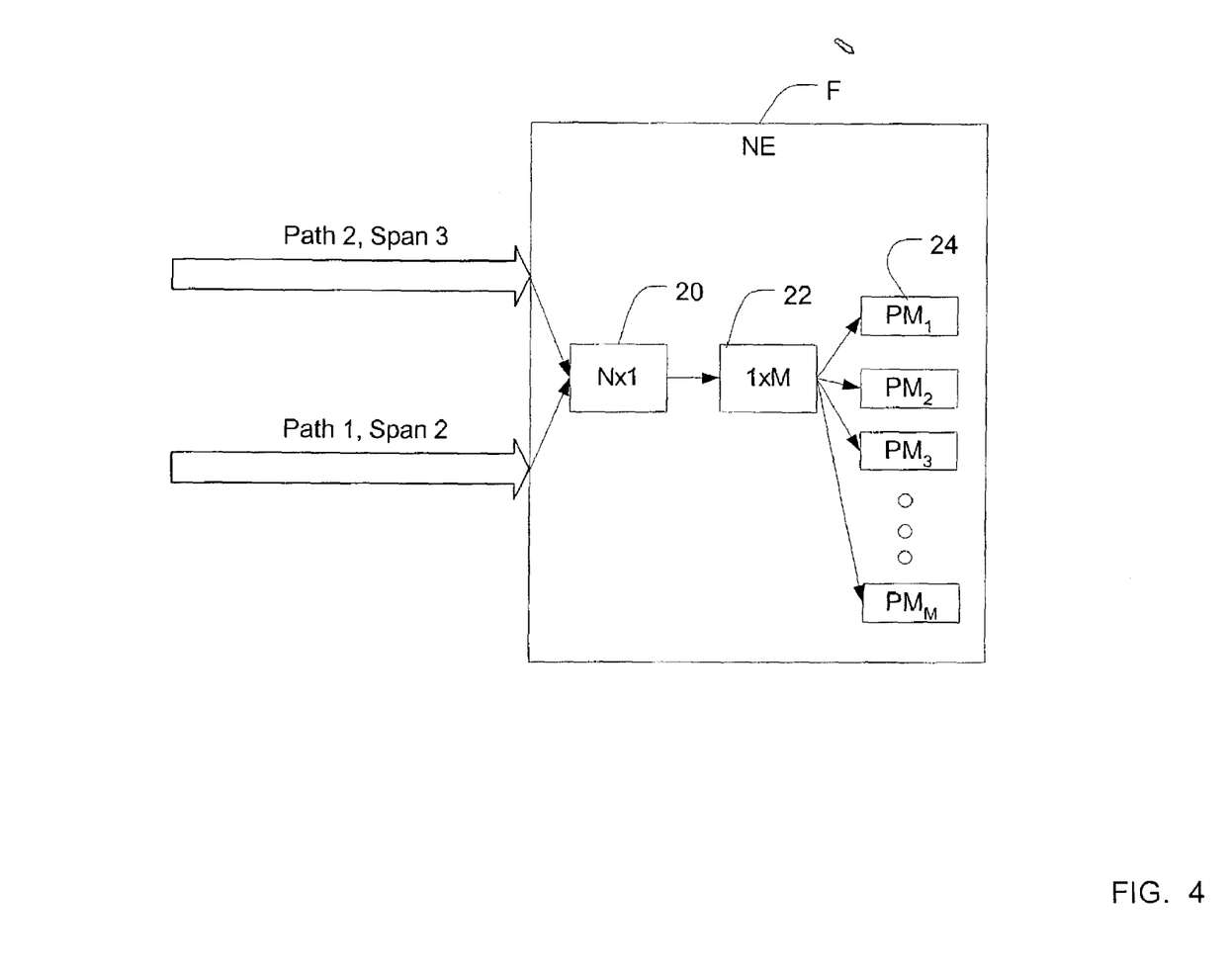
FIG. 4 illustrates components of an exemplary network element for monitoring path performance.

FIG. 4 illustrates components of an exemplary network element F for obtaining signal characteristic measurements. It is understood that other components necessary for routing the received signals are not depicted. The network element may include a N×1 switch 20 that selects one input path for monitoring. The select signal path may be directed to a 1×M switch 22 to direct the signal to one or more performance monitors 24. The performance monitors 24 may process the optical signal directly or convert the received optical signal to an electrical signal.

In addition to, or potentially in place of, the performance monitoring, path transmission parameters are obtained (e.g. received from network elements or stored look-up tables) at step 226. Exemplary transmission parameters include fiber type, amplifier type, channel launch power, channel plan, etc. A path quality indicator is derived at step 228 based on a combination of the signal characteristic measurements and the transmission parameters. The various signal or path characterization measurements and the transmission parameters may be weighted to define the relative contribution to the path quality indicator.

At step 230, the paths are ranked based on path quality indicator and the highest ranked path is selected to satisfy the bandwidth request. At step 232, it is determined whether the highest ranked path has sufficient quality to meet the bandwidth request. If not, the bandwidth request is routed to include regeneration points as shown at step 234. Otherwise, the bandwidth request is routed on the highest ranked path from step 230. At step 236, the path may be validated with additional signal characteristic measurements if desired. The validation may be performed by transmitting test signals along the path and monitoring signal quality at the receiving network element.

The exemplary process of FIG. 3 includes weighting a number of criteria such as the configuration factors, propagation factors, signal characteristic measurements and transmission parameters. One or more of the assigned weights may be zero in order to eliminate contribution of an associated criterion. Additionally, the weights may be adjusted based on specific system configurations or over time to accommodate changes in the communication network. As an example, high channel count transmission systems may value bandwidth less than low channel count systems. As another example, the weight assigned to OEO may initially be high (i.e. 1) due to the high cost of the components. But, as the component cost declines over time, the weight may be reduced to reflect a reduced cost penalty (i.e. to 0.2).

Figure 5:
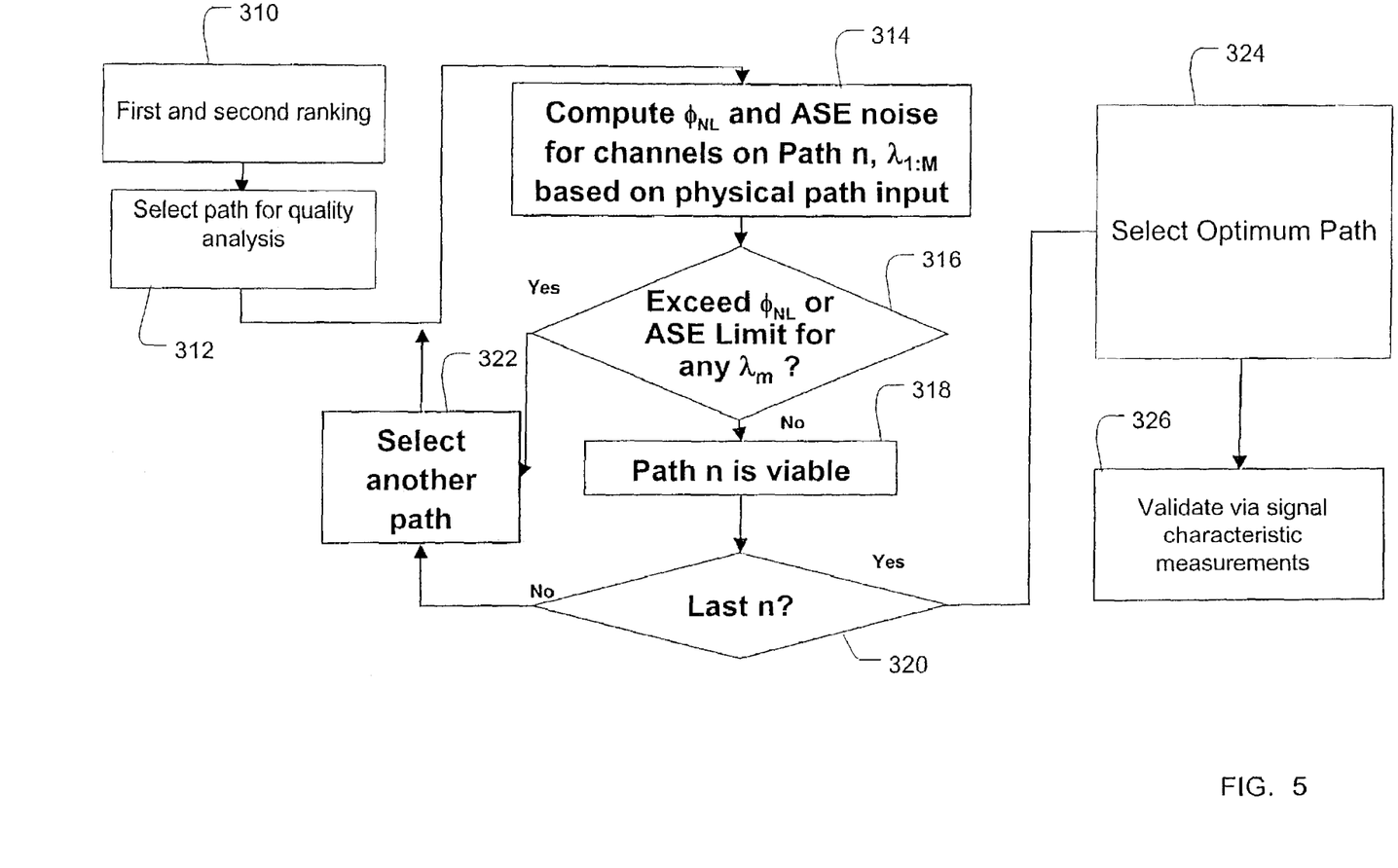
FIG. 5 is a flowchart of an exemplary process for measuring path performance.

FIG. 5 is a flowchart of an exemplary embodiment illustrating one set of signal characteristic measurements used to evaluate path quality. The process begins at step 310 where the first and second ranking processes based on configuration rules and propagation rules are performed. The remaining paths are then evaluated based on path quality as initiated at step 312. At step 314, non-linear phase shift $\Phi_{NL}$ and amplified spontaneous emission (ASE) noise are determined for the first path for a first M wavelengths $\lambda_{1:M}$.

At step 316, it is determined whether the non-linear phase shift $\Phi_{NL}$ or amplified spontaneous emission (ASE) noise exceed respective limits for any wavelength. If the limits are not exceeded, flow proceeds to step 318 where the path is considered viable. If the non-linear phase shift $\Phi_{NL}$ or amplified spontaneous emission (ASE) noise exceed respective limits, flow proceeds to step 322 where another path is selected. This processing continues until step 320 indicates that all paths have been processed.

At step 324, the path having the optimum non-linear phase shift $\Phi_{NL}$ and amplified spontaneous emission (ASE) noise is selected. At step 326, the path may be validated by obtaining signal characteristic measurements for one or more representative signals on the selected path.

Figure 6:
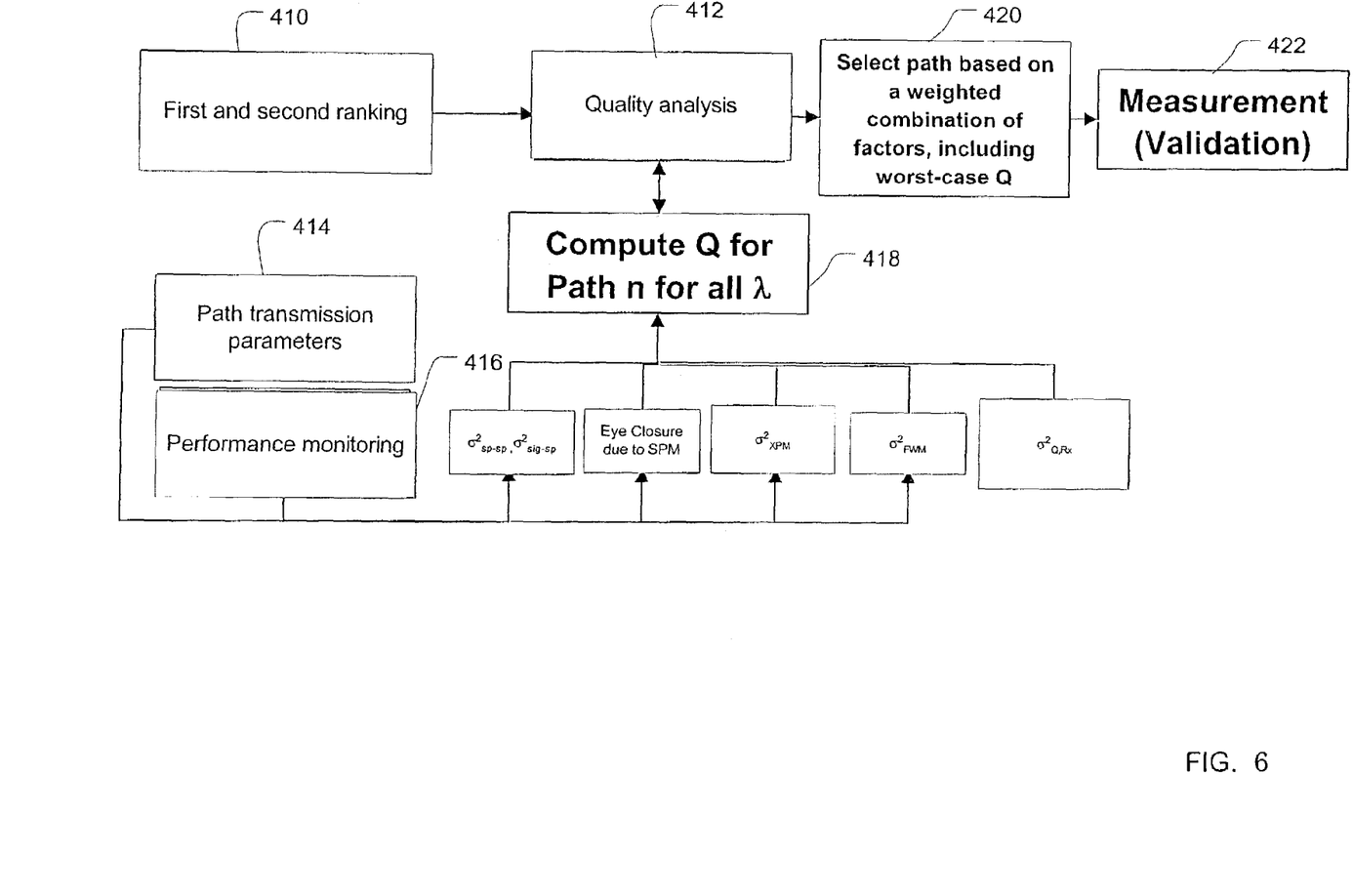
FIG. 6 is a flowchart of another exemplary process for measuring path performance.

FIG. 6 shows an alternate process for allocating bandwidth. The process begins at step 410 where the first and second ranking processes based on configuration rules and propagation rules are performed. The remaining paths are then ranked based on path quality as illustrated at step 412.

Path transmission parameters, shown at 414, and performance monitoring, shown at 416, are used to calculate a number of current noise contributions such as those due to signal-spontaneous and spontaneous-spontaneous beat noise ($\sigma^2_{sig\text{-}sp}$ and $\sigma^2_{sp\text{-}sp}$), cross-phase modulation (XPM) ($\sigma^2_{XPM}$), four wave mixing (FWM) ($\sigma^2_{FWM}$), and back-to-back receiver noise ($\sigma^2_{Rx}$). Additional, parameters such as eye-closure may be determined. The signal characteristic measurements are then combined at 418 to establish the path quality indicator, Q, for each path n for all wavelengths λ. The signal characteristic measurements may be weighted to define the relative contribution to the path quality indicator. Weights may also have a zero value to eliminate contribution of a performance measurement to the path quality indicator.

At 420, one path is selected based on the path quality indicator. The path may be validated at step 422 by measuring representative signals transmitted on the selected path.

Figure 7:
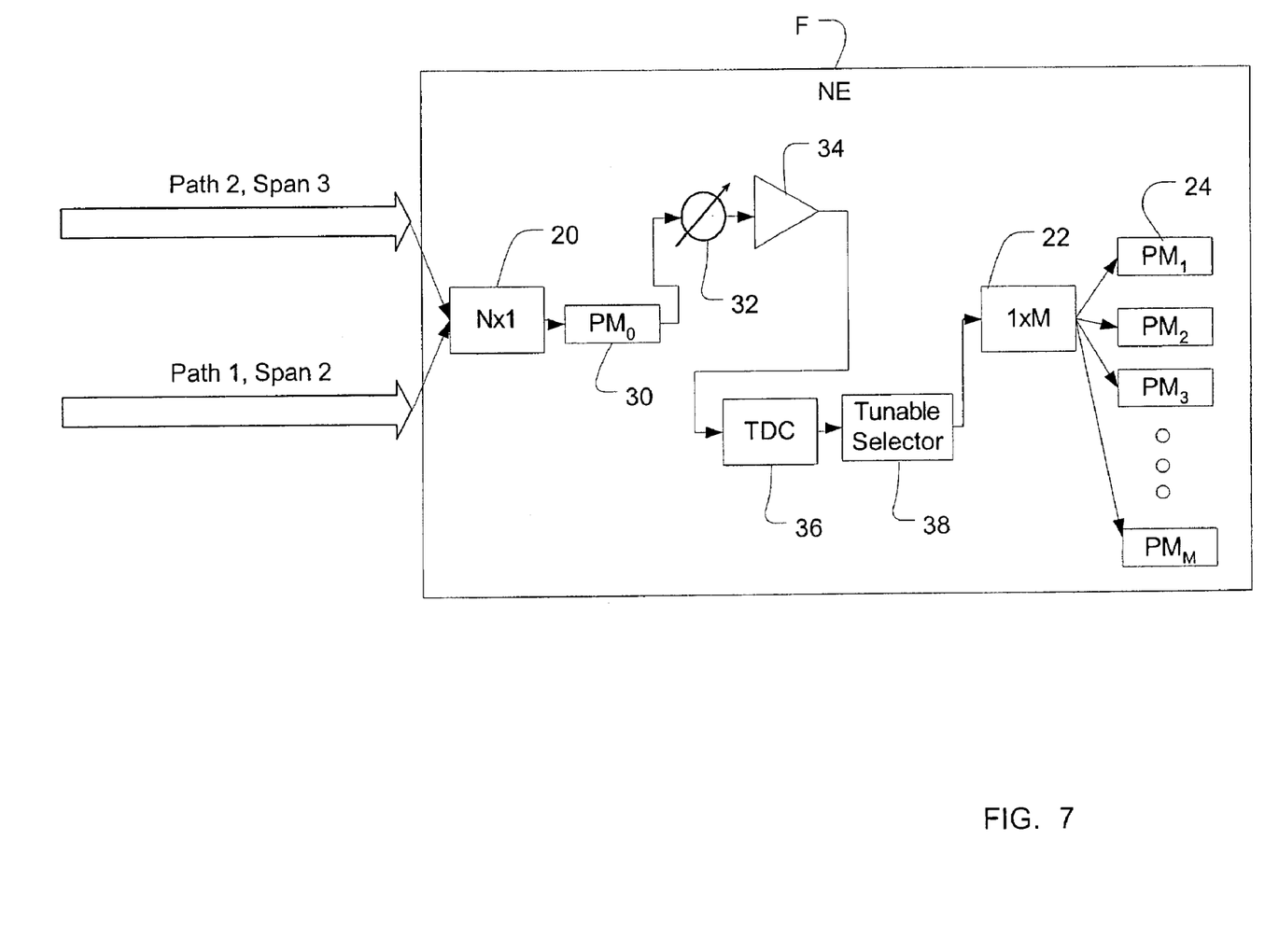
FIG. 7 is a block diagram of a network element in an alternate embodiment.

FIG. 7 depicts an embodiment of a network element that includes a variety of performance monitors and components between the N×1 switch 20 and the 1×M switch 22. The intermediate components allow for conditioning received signals prior to performance monitoring to provide a more accurate representation of path performance. Exemplary components include variable optical attenuator 32, amplifier 34, tunable dispersion, compensator 36 and tunable selector 38. The tunable selector 38 allows specific wavelengths to be selected for performance monitoring. Individual wavelengths can then be routed to performance monitors 24 through the 1×M switch 22.

As noted above, the method may be implemented during various stages of the communication network design and implementation. During the design phase, the configuration rules and propagation rules are used to determine appropriate paths for allocating bandwidth. The communication network may then be constructed and path quality determined through test signals to finalize bandwidth allocation among paths.

During operation, the communication network may allocate bandwidth among paths in response to a request for additional bandwidth, or based on a detection of a need for re-allocation of bandwidth. For example, one path may be over capacity while other paths have significant available capacity. In this scenario, re-allocating existing bandwidth may be performed using embodiments of the invention.

Figure 8:
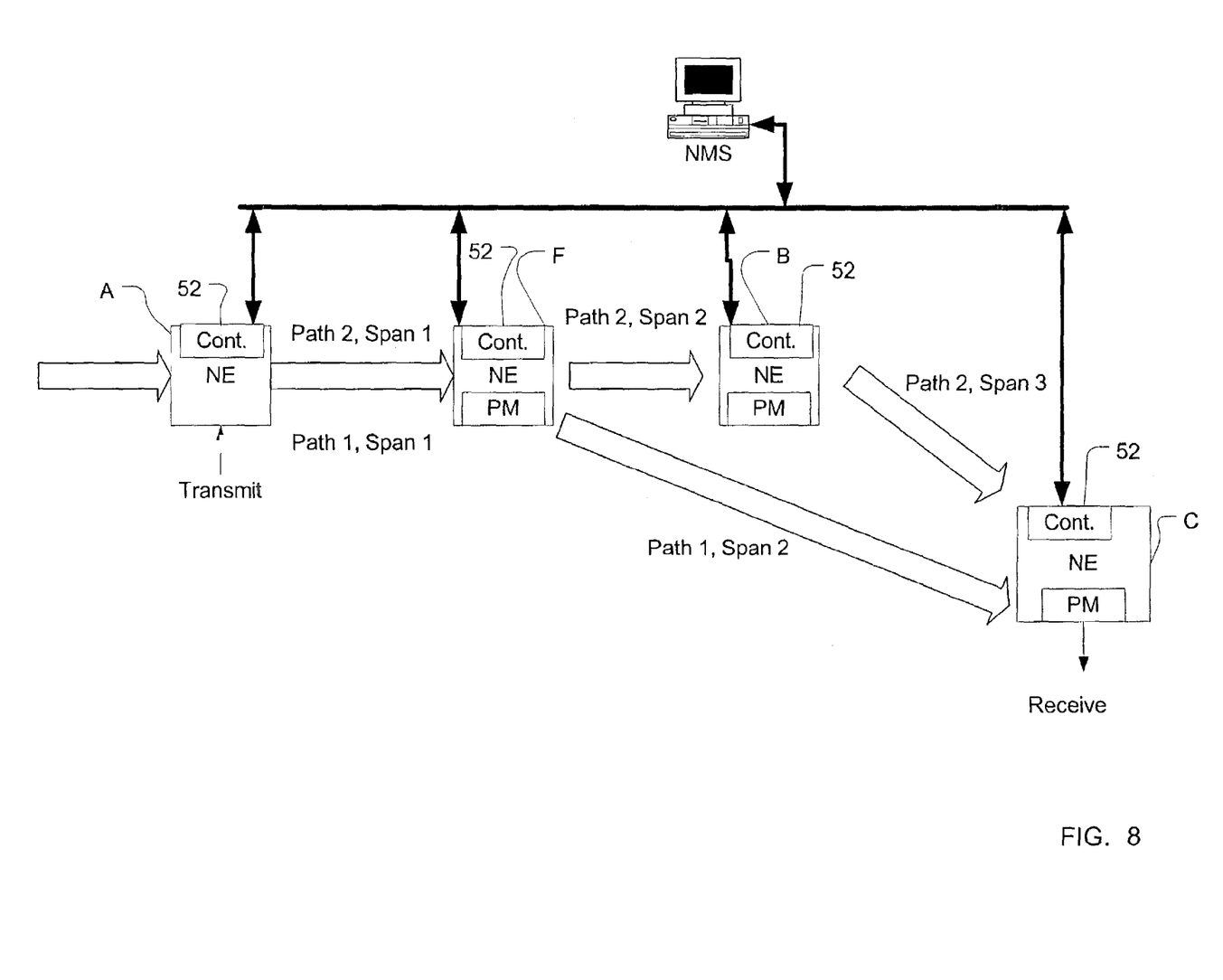
FIG. 8 is a block diagram of a communication system in an embodiment of the invention.

FIG. 8 is a block diagram illustrating a portion of communication network 100 in communication with a network management system (NMS) 110. Each network element includes a controller 52 in communication with the NMS 110. The communication may be provided by a separate network (e.g., an overlay IP network) or via a service channel on the communication network 100.

If a request for additional bandwidth is received, for example from client equipment or from a user interface, the NMS 110 evaluates the possible paths and determines which path will accommodate the additional bandwidth. The NMS 110 includes a database containing the network topology including existing paths. The NMS 110 has the information needed to apply the configuration rules and propagation rules and perform the first and second ranking of paths. The NMS 110 also contains the transmission parameters used in the determining path quality. The individual network elements provide the signal characteristic measurements to the NMS 110 through controller 52. Thus, the NMS 110 can determine path quality by implementing, for example, the process shown in FIG. 3. Once the appropriate path is identified, the NMS 110 communicates with the network elements to establish the appropriate connections from network element A to network element C.

Although a single NMS 110 is shown in FIG. 8, it is understood that multiple networks, coupled through gateway elements, each including an NMS 110 may be employed. Alternatively, each network element may execute software for allocating bandwidth as described herein.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for allocating bandwidth among a plurality of paths in an optical communication network, the method comprising:
   performing a first ranking of the plurality of paths based on one or more configuration rules;
   eliminating from consideration a lowest ranked path based on the configuration rules to define first paths;
   performing a second ranking of the first paths based on propagation rules;
   eliminating from consideration a lowest ranked path based on the propagation rules to define second paths;
   obtaining signal characteristic measurements from the plurality of paths, wherein the signal characteristic measurements from the plurality of paths are measured with an optical performance monitor;
   obtaining transmission parameters from the plurality of paths, wherein the transmission parameters comprise fiber type, amplifier type, channel launch power, and channel plan;
   determining a path quality indicator for the second paths and ranking the second paths based on the path quality indicator to define ranked second paths, the path quality indicator being dependent on a weighted combination of the signal characteristic measurements and the transmission parameters; and,
   selecting one of the ranked second paths based on the path quality indicator and allocating the bandwidth to the one of the ranked second paths.

2. The method of claim 1 wherein:
   the configuration rules evaluate a number of configuration factors, said first ranking further comprising combining configuration factors to define a configuration rank used in said first ranking.

3. The method of claim 2 wherein:
   said combining includes weighting the configuration factors, wherein the weighting is adjusted based on one of specific configurations and adjustments over time to accommodate changes in the optical communication network.

4. The method of claim 1 further comprising:
   eliminating from consideration a path based on failure to satisfy a configuration constraint.

5. The method of claim 1 wherein:
   the propagation rules evaluate a number of propagation factors, said second ranking further comprising combining propagation factors to define a propagation rank used in said second ranking.

6. The method of claim 5 wherein:
said combining includes weighting the propagation factors, wherein the weighting is adjusted based on one of specific configurations and adjustments over time to accommodate changes in the optical communication network.

7. The method of claim 1 further comprising:
eliminating from consideration a path based on failure to satisfy a propagation constraint.

8. The method of claim 1 further comprising:
validating the selected one of the ranked second paths.

9. A system for allocating bandwidth among a plurality of paths in an optical communication network, the system comprising:
a plurality of network elements coupled by a plurality of paths, wherein each of the plurality of network elements comprises an optical performance monitor configured to measure signal characteristics of the plurality of paths;
a network management system in communication with said network elements, said network management system implementing a process comprising:
performing a first ranking of the plurality of paths based on one or, more configuration rules;
eliminating from consideration a lowest ranked path based on the configuration rules to define first paths;
performing a second ranking of the first paths based on propagation rules;
eliminating from consideration a lowest ranked path based on the propagation rules to define second paths;
obtaining signal characteristic measurements from the optical performance monitor,
obtaining transmission parameters for the second paths, wherein the transmission parameters comprise fiber type, amplifier type, channel launch power, and channel plan;
determining a path quality indicator for the second paths and ranking the second paths based on the path quality indicator to define ranked second paths, the path quality indicator being dependent on a weighted combination of the signal characteristic measurements and the transmission parameters; and,
selecting one of the ranked second paths based on the path quality indicator and allocating the bandwidth to the one of the ranked second paths.

10. The system of claim 9 wherein:
the configuration rules evaluate a number of configuration factors, the first ranking further comprising combining configuration factors to define a configuration rank used in said first ranking.

11. The system of claim 10 wherein:
the combining includes weighting the configuration factors, wherein the weighting is adjusted based on one of specific configurations and adjustments over time to accommodate changes in the optical communication network.

12. The system of claim 9 wherein:
said network management system eliminates from consideration a path based on failure to satisfy a configuration constraint.

13. The system of claim 9 wherein:
the propagation rules evaluate a number of propagation factors, said second ranking further comprising combining propagation factors to define a propagation rank used in said second ranking.

14. The system of claim 13 wherein:
the combining includes weighting the propagation factors, wherein the weighting is adjusted based on one of specific configurations and adjustments over time to accommodate changes in the optical communication network.

15. The system of claim 9 wherein:
said network management system eliminates from consideration a path based on failure to satisfy a propagation constraint.

16. The system of claim 9 further comprising:
validating the selected one of the ranked second paths.

17. A method for allocating bandwidth among a plurality of paths in an optical communication network, the method comprising:
performing a ranking of the plurality of paths based on one of configuration rules and propagation rules;
eliminating from consideration a lowest ranked path based on the said ranking to define ranked paths;
measuring signal characteristics of the plurality of paths with an optical performance monitor;
obtaining transmission parameters for the plurality of paths, wherein the transmission parameters comprise fiber type, amplifier type, channel launch power, and channel plan;
determining a path quality indicator for the ranked paths responsive to a weighted combination of the measured signal characteristics and the transmission parameters;
selecting one of the ranked paths and allocating the bandwidth to the one of the ranked paths in response to the path quality indicator; and
validating the selected one of the ranked paths;
wherein the configuration rules, the propagation rules, the signal characteristics, and the transmission parameters comprise weightings, and wherein the weightings are adjusted based on one of specific configurations and adjustments over time to accommodate changes in the optical communication network.

* * * * *